Figure 1:

May 22, 1945.  R. V. BOYER  2,376,653
LAMINATED STRUCTURE
Filed March 31, 1942

LAMINATED RESIN IMPREGNATED AND COATED SHEET OR BOARD

THERMOSET RESIN IN CELLULAR FORM

LAMINATED RESIN IMPREGNATED AND COATED SHEET OR BOARD

THERMOSET RESIN IN CELLULAR FORM

SPACERS OF THERMOSET RESIN, WOOD, ETC.

Inventor:
Ralph V. Boyer,
by Harry E. Dunham
His Attorney.

Patented May 22, 1945

2,376,653

UNITED STATES PATENT OFFICE 2,376,653

LAMINATED STRUCTURE

Ralph V. Boyer, Nahant, Mass., assignor to General Electric Company, a corporation of New York Application March 31, 1942, Serial No. 436,926

1 Claim. (Cl. 154—45.9)

This invention relates to the production of a laminated structure and particularly to a laminated structure composed of a plurality of spaced sheets or boards of resin impregnated material confining between them a thermoset resinous composition in porous or cellular form.

The principal object of the invention is the production of a finished product of excellent rigidity and strength and lightness in weight which product may be used for various constructional, decorative and insulation purposes. Other objects will be apparent from the description of the invention.

In the drawing

Figure 2:
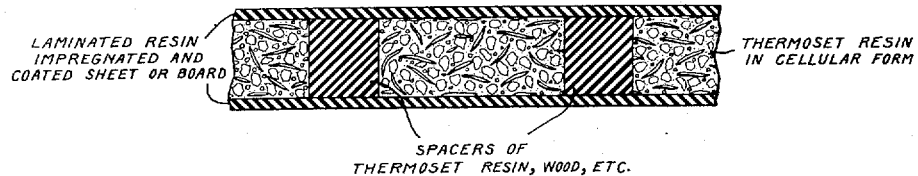

Figure 1 shows a view in elevation of one form of my invention while Figure 2 shows a modification.

It has heretofore been suggested that lightweight porous structures may be produced by using rubber or other thermoplastic material in cellular or porous form or by causing an agent such as a gas to produce a cellular structure in the material. Certain thermoplastic materials, such as cellulose esters, have been suggested for use as base material with a gas forming salt to produce the porous structure. As far as I am aware, all these prior suggestions involving thermoplastic materials, do not give products of sufficient rigidity and strength coupled with lightness in weight, and additionally, can be made only in small relatively thin cross-sectional pieces.

In accordance with my invention laminated structures of excellent rigidity and strength and relatively thick cross-sectional area may be produced while at the same time maintaining lightness in weight.

One method by which the products of my invention may be produced is as follows:

A laminated material, such as a fibrous sheet or sheets bonded with a thermoset resin, is placed in an ordinary platen press. Between this sheet and another is placed a thermosetting resin, in either the liquid or solid state, the resin being in a convertible stage. The side of each sheet facing the resin may be sanded to improve the bond between the sheets and resin foam. The press is closed, the closing being limited by stops surrounding the laminating material and resin so as to confine the resin between the sheets. Heat is applied and the uncured resin is allowed to fuse, foam and form a cellular structure, forcing the laminating sheets against the press platens. Ordinarily no gas producing or foaming agent is necessary but may be added to the resin before molding, particularly in large sections where it may be necessary to control the uniformity of the cellular spaces. As soon as the resin is cured to the infusible state the laminated structure may be removed from the press. Figure 1 shows a cross-section of the finished product which is hard, rigid and light in weight.

The strength of the product may be increased by adding to the resinous composition between the laminating sheets small percentages of fillers or reinforcing materials such as matted fibrous materials examples of which are sisal, cocoanut shell fibres, wood excelsior, etc. It has been found that such a mat reinforces the structure and keeps the laminated sheets apart and against the platens during the curing operation. The percentage of reinforcing agent can be varied and it has been found that 10 to 15% is an excellent percentage to use.

Sheets of large area may be used to produce large size products and to offset any tendency to buckle or warp, spacers are placed between the sheets as shown in Figure 2 of the drawing. These spacers may be of any suitable material, e. g., wood, laminated synthetic thermosetting resin impregnated material, etc., and form an integral part of the finished product.

Various thermosetting resins may be used in producing the products of my invention. Among those which may be used are thermosetting resins of the phenol-aldehyde type, urea-aldehyde type and various thermosetting resinous compositions such as, phenol formaldehyde-protein resins, phenol formaldehyde-polyvinyl formal resins, phenol formaldehyde-polyvinyl alcohol resins, phenol formaldehyde-glycerine resins, phenol formaldehyde-urea resins, phenol formaldehyde-melamine resins, phenol formaldehyde-diazine resins, phenol furfural resins, phenol furfural formaldehyde resins, triazine formaldehyde resins, benzene disulphonamide-acrolein resins, melamine dicyandiamide resins, polyethylene maleate-ethyl methacrylate resins, polypropyl maleate-vinyl acetate resins, methyl methacrylate-glycol methacrylate resins, polyvinyl chloride-diallyl succinate resins, styrene-divinyl benzene resins, etc.

The percentage of resin need not be high to produce satisfactory products. It will vary with the size of the product and the intended use. The most desirable resin content of the porous space is about 30% by volume. Percentages as low as 10 and 15% produce a very weak structure, while higher resin percentages give some increase in strength coupled with increase in density and cost of the product. The optimum resin percentage is 30 to 53% by volume to give a product having the best combination of properties.

One of the principal advantages of my invention is the facility with which structures of large area may be produced. Such structures are of high strength and rigidity coupled with relative lightness in weight.

Thus, in accordance with the present invention it is possible to produce laminated structures having a specific gravity of the order of for example 0.7 in a ¼" board where the resin content averages about 32% by volume, the filler or reinforcing agent averages about 11% by volume and the air space averages about 57% by volume, the flexural strength of the product averaging from about 4,700 pounds per square inch to about 7,600 pounds per square inch.

Moreover, it is possible to produce structures of relatively thick cross-sectional area. While thin structures offer no difficulty in formation it has heretofore been a difficult problem to produce large, strong, rigid structures of porous or cellular material of thick cross-sectional area.

The products of my invention lend themselves for use as insulating board material, decorative panel material, refrigerator cabinet construction and various other uses.

What I claim as new and desire to secure by Letters Patent of the United States is:

A rigid, mechanically strong, lightweight laminated structure comprising spaced sheets of laminated fibrous material containing a thermoset synthetic resinous composition, an infusible, insoluble cellular synthetic resinous composition surrounding and coating a resilient, matted reinforcing filler material between said spaced sheets and spacers of thermoset synthetic resinous composition between the inner surfaces of said spaced sheets forming an integral part of said laminated structure, the percentage by volume of synthetic resinous composition between the spaced laminated sheets being about 30% and the percentage by volume of the reinforcing filler material being about 10 to 15%, the flexural strength of said laminated structure in ¼" thickness averaging from about 4,700 pounds per square inch to about 7,600 pounds per square inch.

RALPH V. BOYER.

---

CERTIFICATE OF CORRECTION.

Patent No. 2,376,653. May 22, 1945.

RALPH V. BOYER.

It is hereby certified that error appears in the printed specification of the above numbered patent requiring correction as follows: Page 2, first column, line 1, for "30 to 53%" read --30 to 35%--; and that the said Letters Patent should be read with this correction therein that the same may conform to the record of the case in the Patent Office.

Signed and sealed this 21st day of August, A. D. 1945.

Leslie Frazer (Seal) First Assistant Commissioner of Patents.

resin percentage is 30 to 53% by volume to give a product having the best combination of properties.

One of the principal advantages of my invention is the facility with which structures of large area may be produced. Such structures are of high strength and rigidity coupled with relative lightness in weight.

Thus, in accordance with the present invention it is possible to produce laminated structures having a specific gravity of the order of for example 0.7 in a ¼" board where the resin content averages about 32% by volume, the filler or reinforcing agent averages about 11% by volume and the air space averages about 57% by volume, the flexural strength of the product averaging from about 4,700 pounds per square inch to about 7,600 pounds per square inch.

Moreover, it is possible to produce structures of relatively thick cross-sectional area. While thin structures offer no difficulty in formation it has heretofore been a difficult problem to produce large, strong, rigid structures of porous or cellular material of thick cross-sectional area.

The products of my invention lend themselves for use as insulating board material, decorative panel material, refrigerator cabinet construction and various other uses.

What I claim as new and desire to secure by Letters Patent of the United States is:

A rigid, mechanically strong, lightweight laminated structure comprising spaced sheets of laminated fibrous material containing a thermoset synthetic resinous composition, an infusible, insoluble cellular synthetic resinous composition surrounding and coating a resilient, matted reinforcing filler material between said spaced sheets and spacers of thermoset synthetic resinous composition between the inner surfaces of said spaced sheets forming an integral part of said laminated structure, the percentage by volume of synthetic resinous composition between the spaced laminated sheets being about 30% and the percentage by volume of the reinforcing filler material being about 10 to 15%, the flexural strength of said laminated structure in ¼" thickness averaging from about 4,700 pounds per square inch to about 7,600 pounds per square inch.

RALPH V. BOYER.

---

CERTIFICATE OF CORRECTION.

Patent No. 2,376,653.                May 22, 1945.

RALPH V. BOYER.

It is hereby certified that error appears in the printed specification of the above numbered patent requiring correction as follows: Page 2, first column, line 1, for "30 to 53%" read --30 to 35%--; and that the said Letters Patent should be read with this correction therein that the same may conform to the record of the case in the Patent Office.

Signed and sealed this 21st day of August, A. D. 1945.

Leslie Frazer (Seal)                First Assistant Commissioner of Patents.